Figure 10:
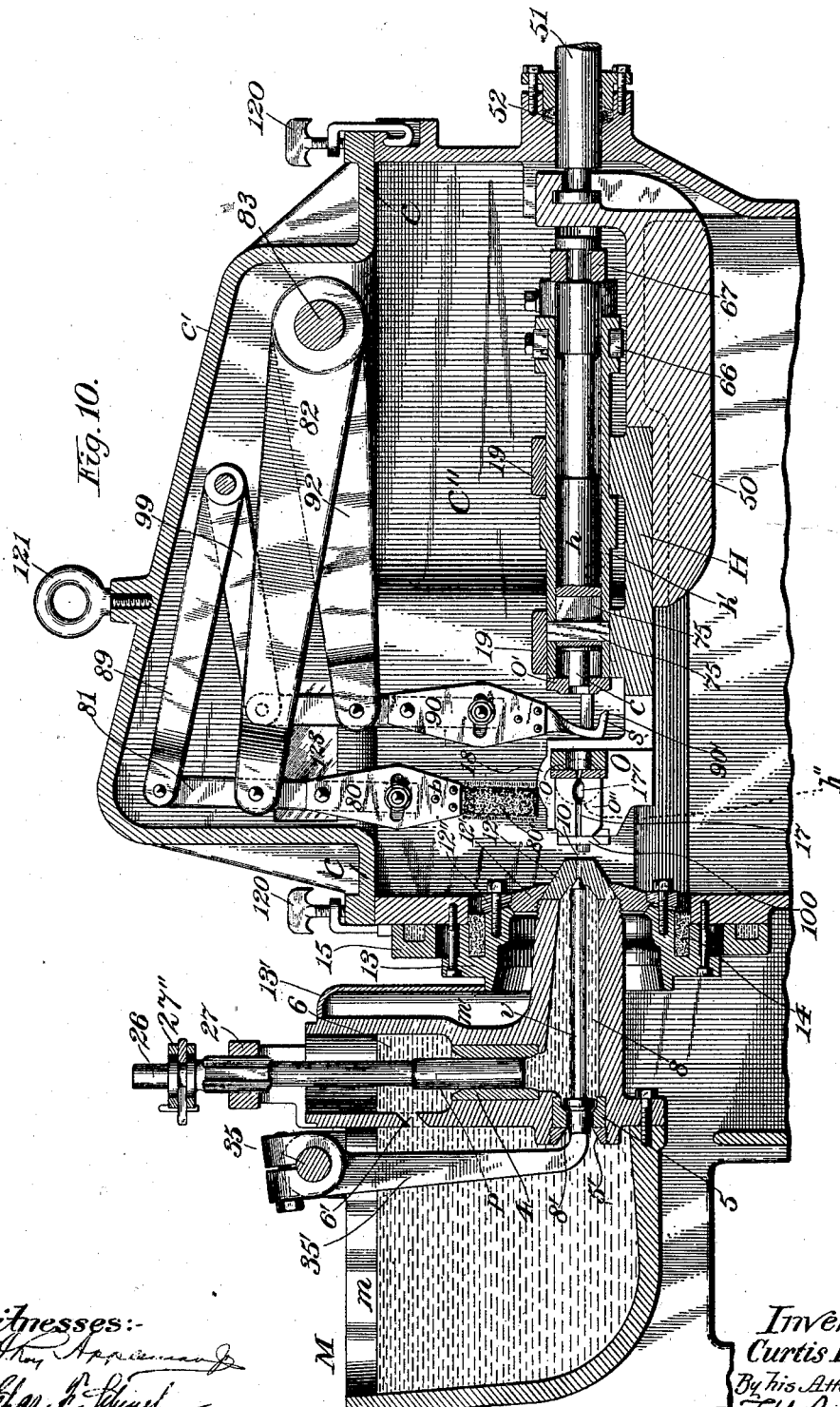

No. 698,591. Patented Apr. 29, 1902.
C. H. VEEDER.
CASTING MACHINE.
(Application filed Feb. 15, 1900.)
(No Model.) 10 Sheets—Sheet 1.
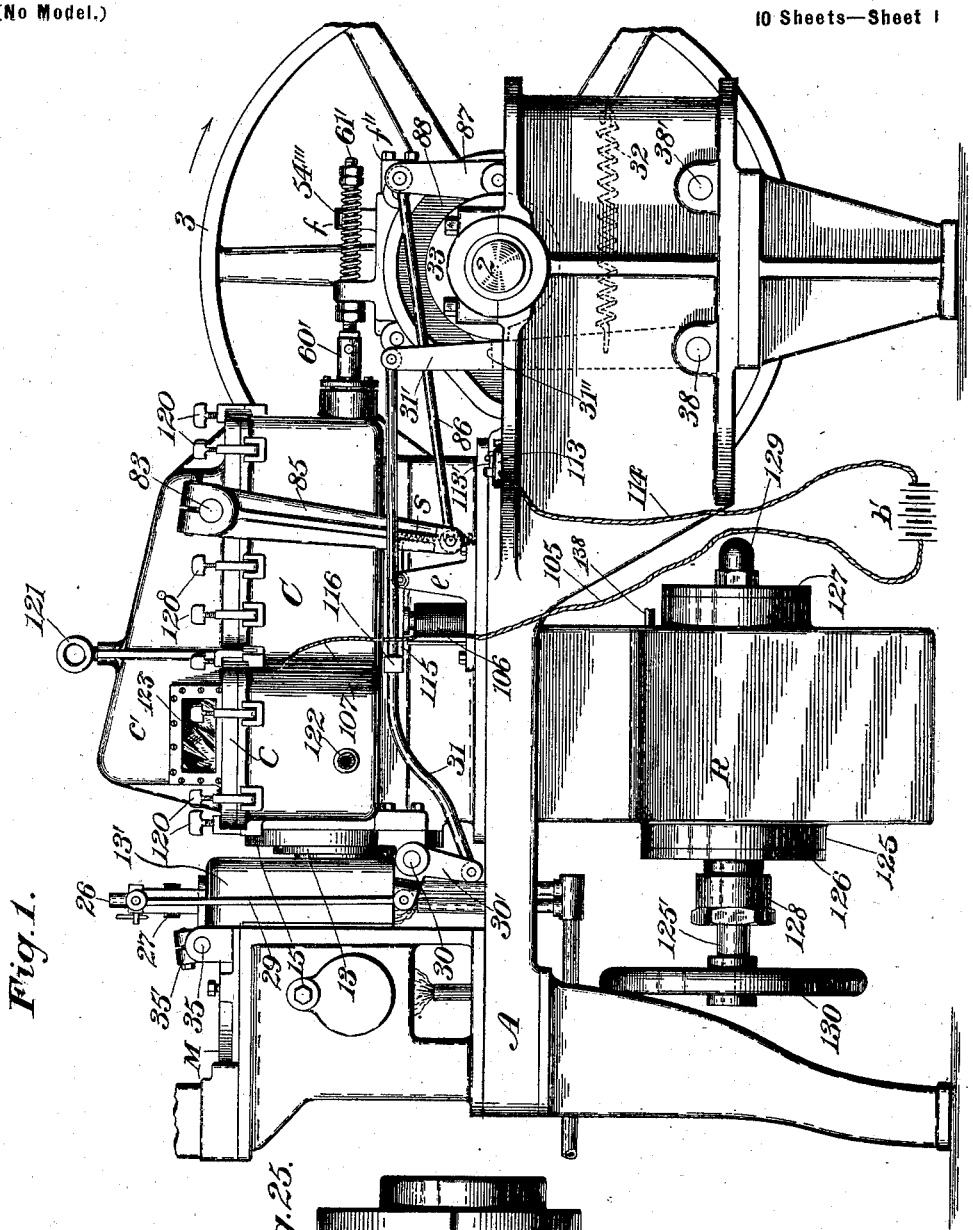
Witnesses:
Inventor.
Curtis H. Veeder.
By his Attorney, No. 698,591. Patented Apr. 29, 1902.
C. H. VEEDER.
CASTING MACHINE.
(Application filed Feb. 15, 1900.)
(No Model.) 10 Sheets—Sheet 2.
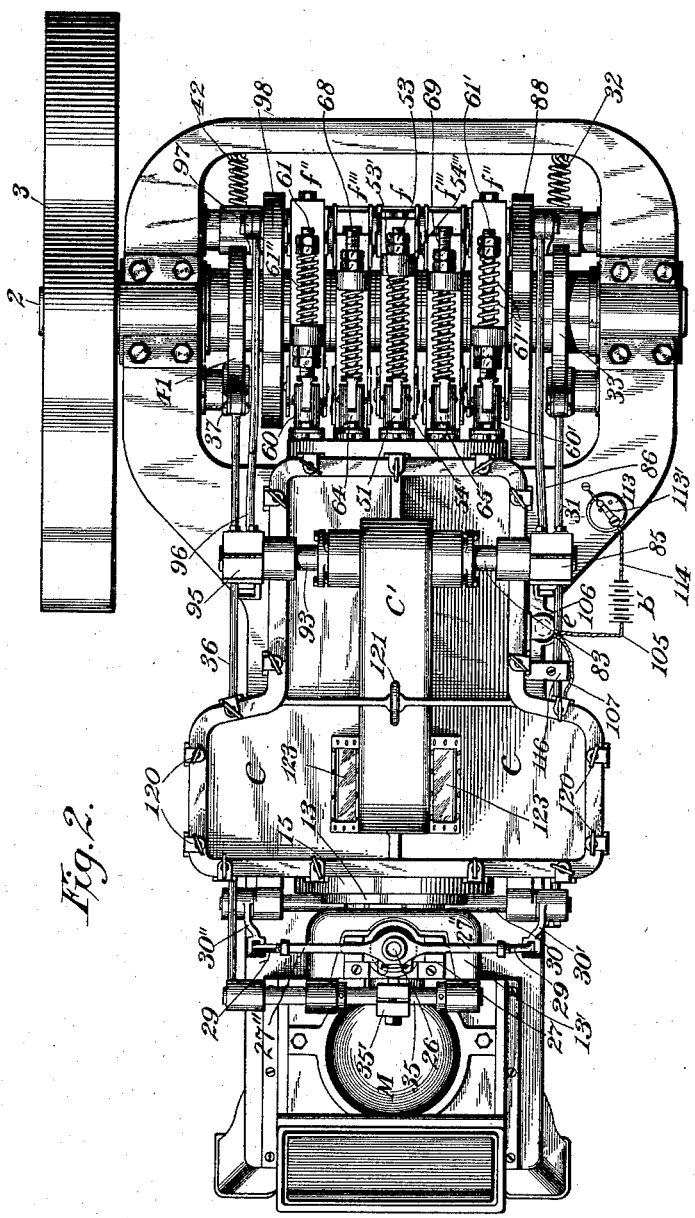
Witnesses:—
Inventor:
Curtis H. Veeder.
By his Attorney, No. 698,591. Patented Apr. 29, 1902.
C. H. VEEDER.
CASTING MACHINE.
(Application filed Feb. 15, 1900.)
(No Model.) 10 Sheets—Sheet 3.
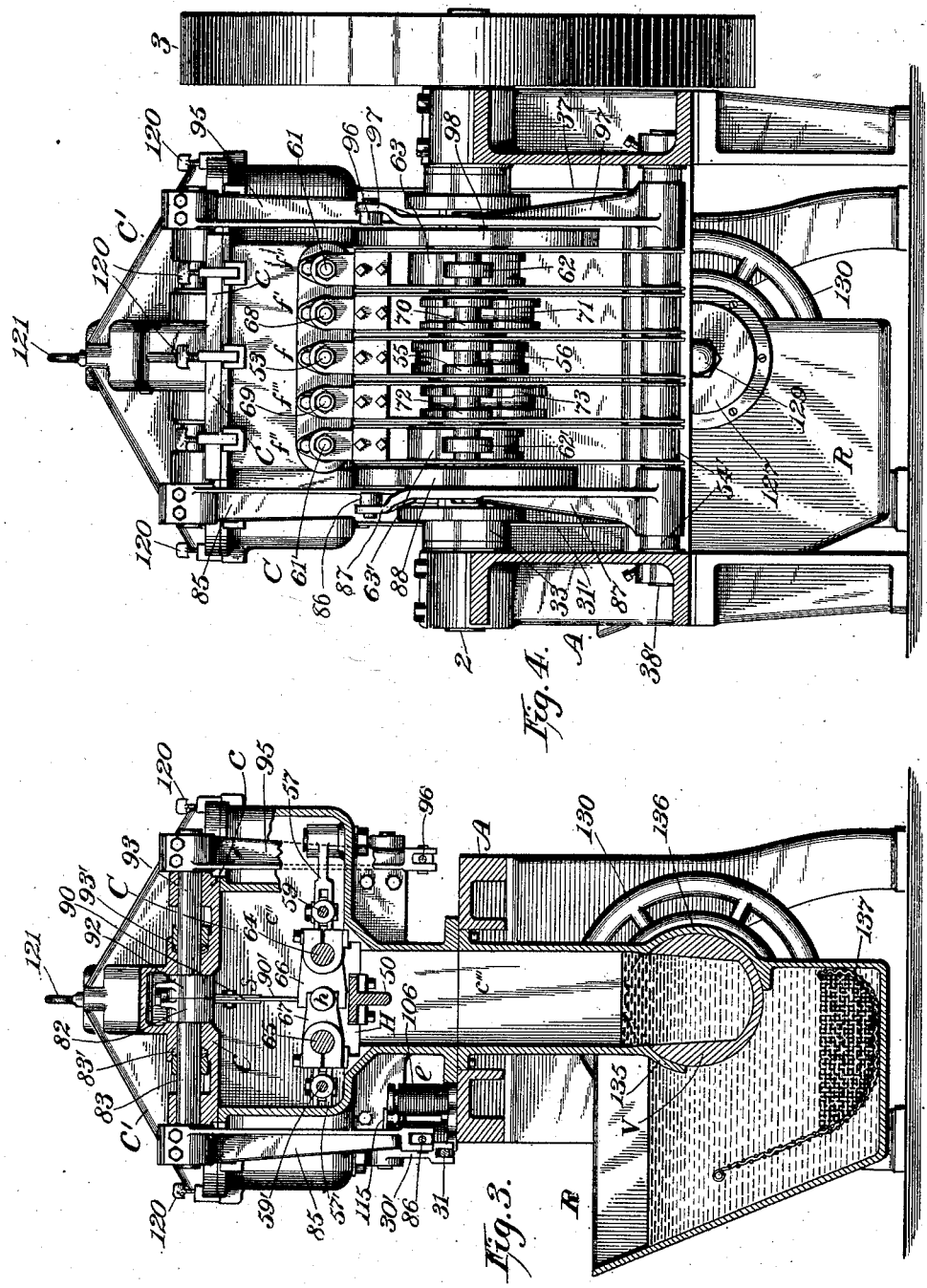
Witnesses:—
A. Roy Appleman
Chas. F. Schmelz
Inventor;
Curtis H. Veeder.
By his Attorney
F. H. Richards.

No. 698,591. Patented Apr. 29, 1902.
C. H. VEEDER.
CASTING MACHINE.
(Application filed Feb. 15, 1900.)
(No Model.) 10 Sheets—Sheet 4.
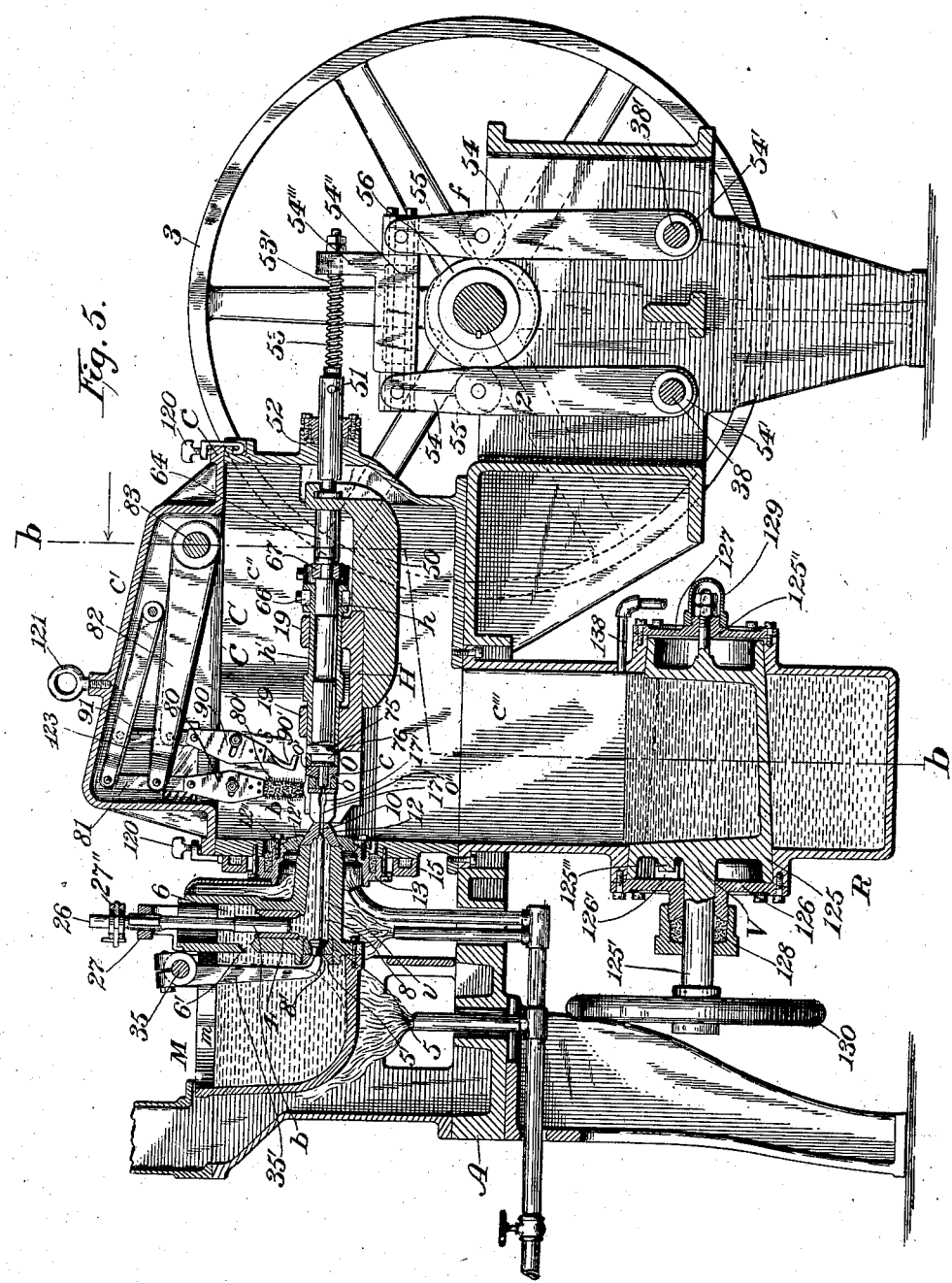
Witnesses:
A. Roy Appleman
Chas. L. Shurly
Inventor,
Curtis H. Veeder.
By his Attorney,
F. H. Richards.
THE NORRIS PETERS CO., PHOTO-LITHO., WASHINGTON, D. C.

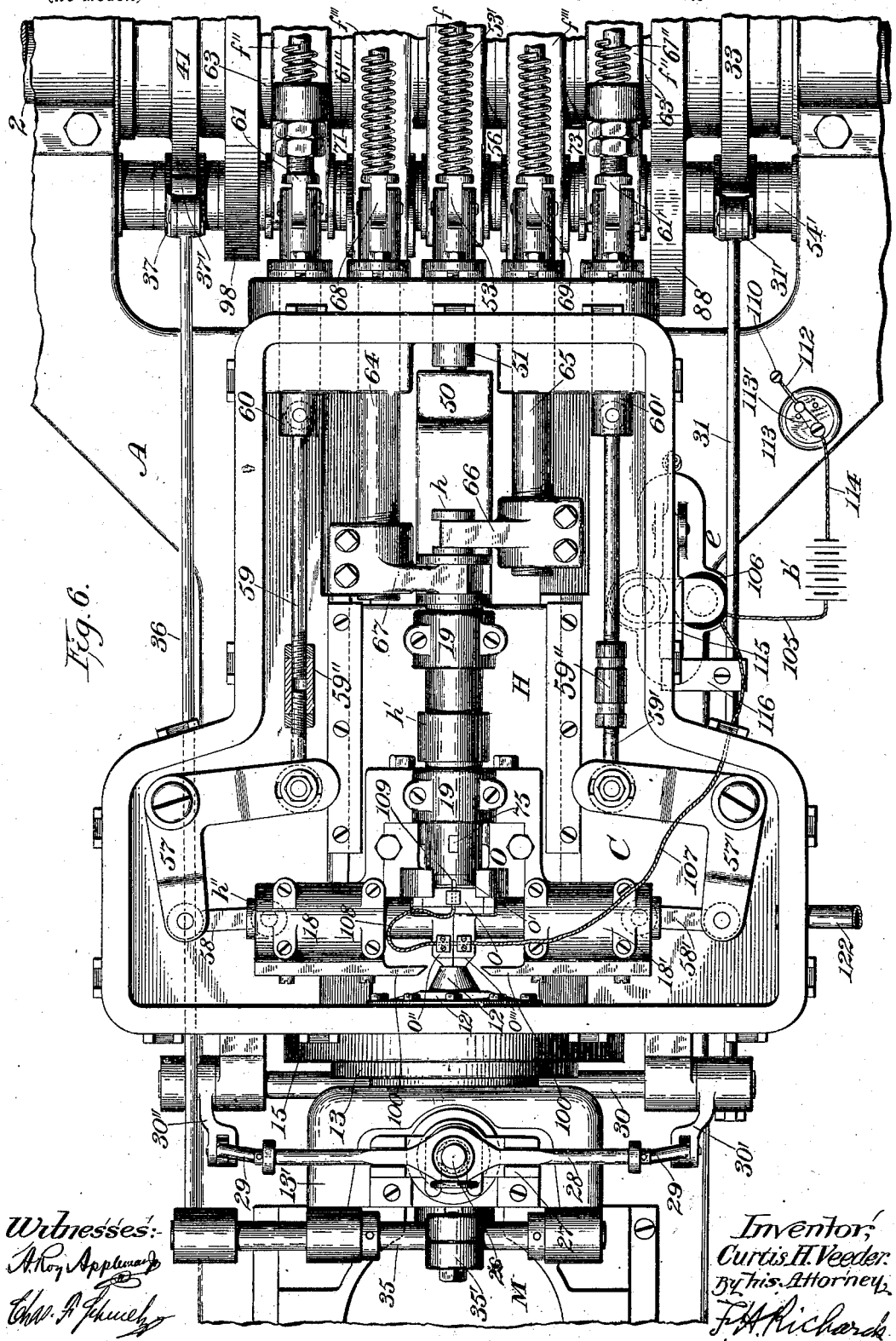

No. 698,591. Patented Apr. 29, 1902.
C. H. VEEDER.
CASTING MACHINE.
(Application filed Feb. 15, 1900.)
(No Model.) 10 Sheets—Sheet 6.
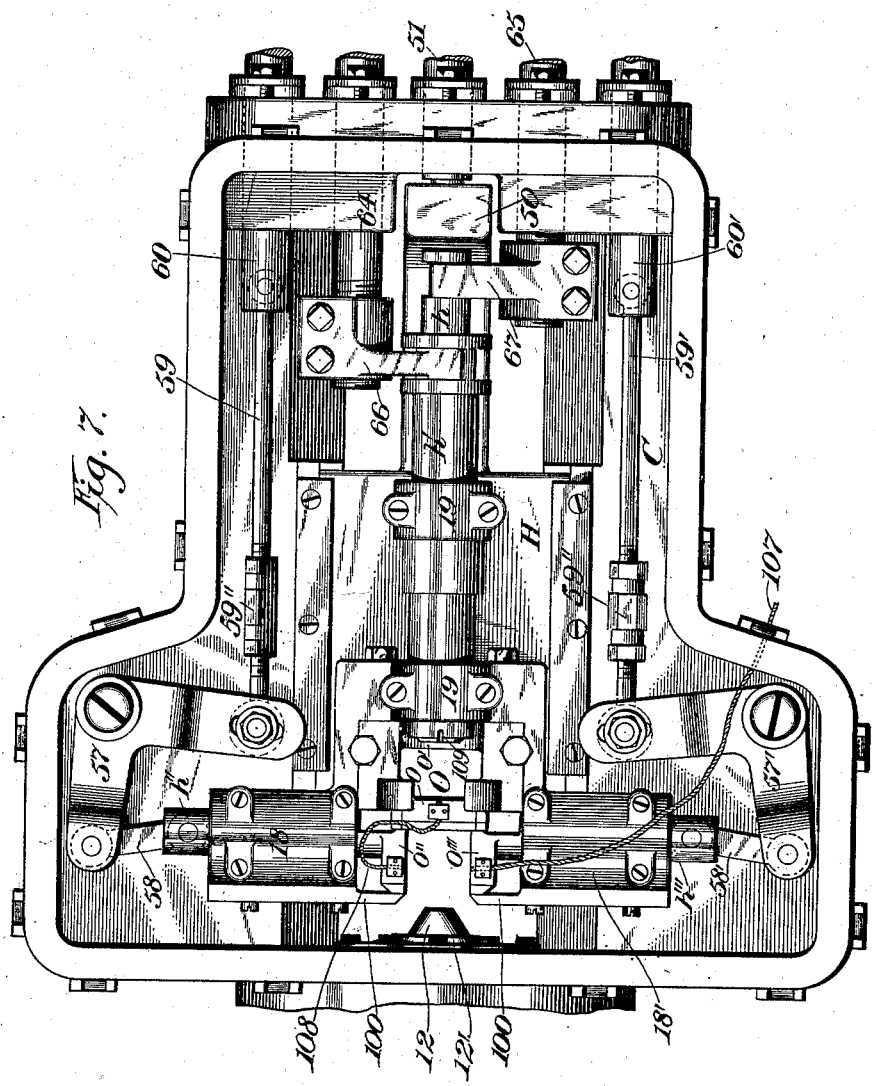
Witnesses:
Inventor,
Curtis H Veeder:
By his Attorney, No. 698,591. Patented Apr. 29, 1902.
C. H. VEEDER.
CASTING MACHINE.
(Application filed Feb. 15, 1900.)
(No Model.) 10 Sheets—Sheet 7.
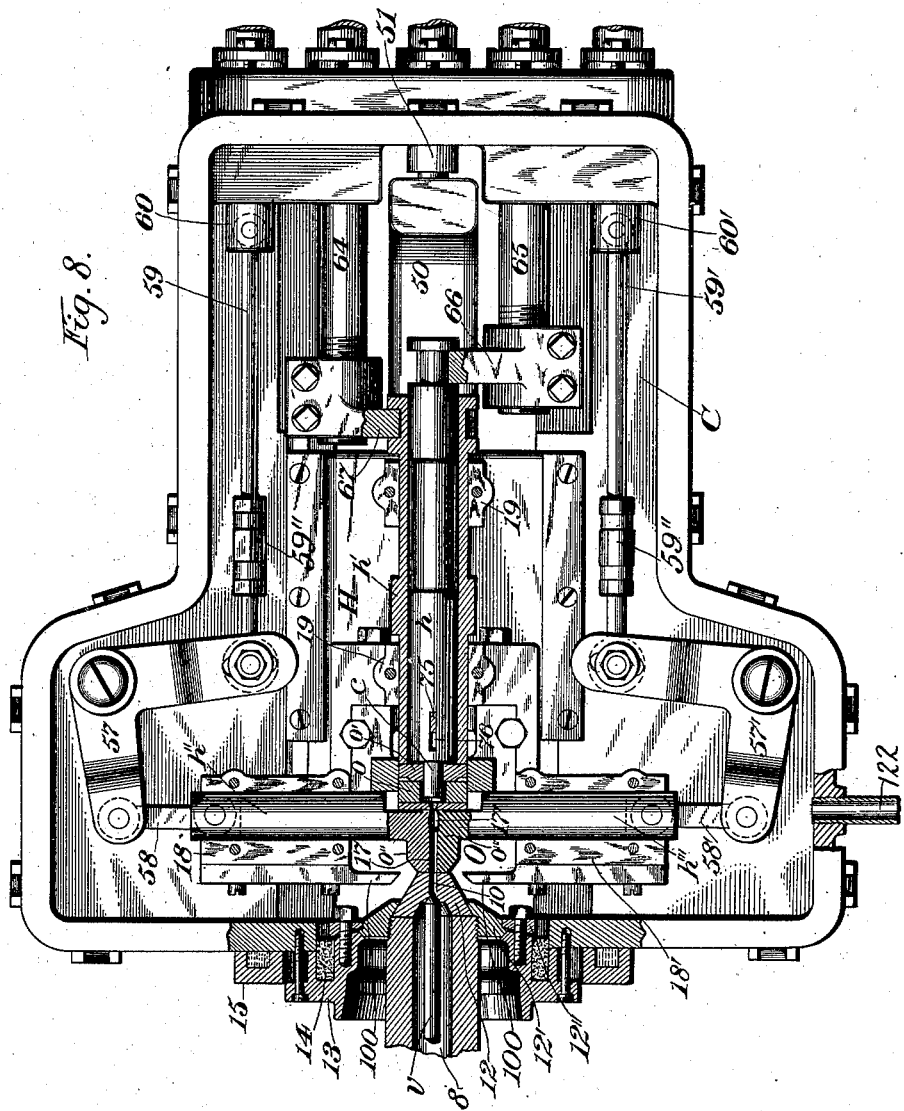
Witnesses:
Inventor,
Curtis H. Veeder.
By his Attorney, No. 698,591. Patented Apr. 29, 1902.
C. H. VEEDER.
CASTING MACHINE.
(Application filed Feb. 15, 1900.)
(No Model.) 10 Sheets—Sheet 8.
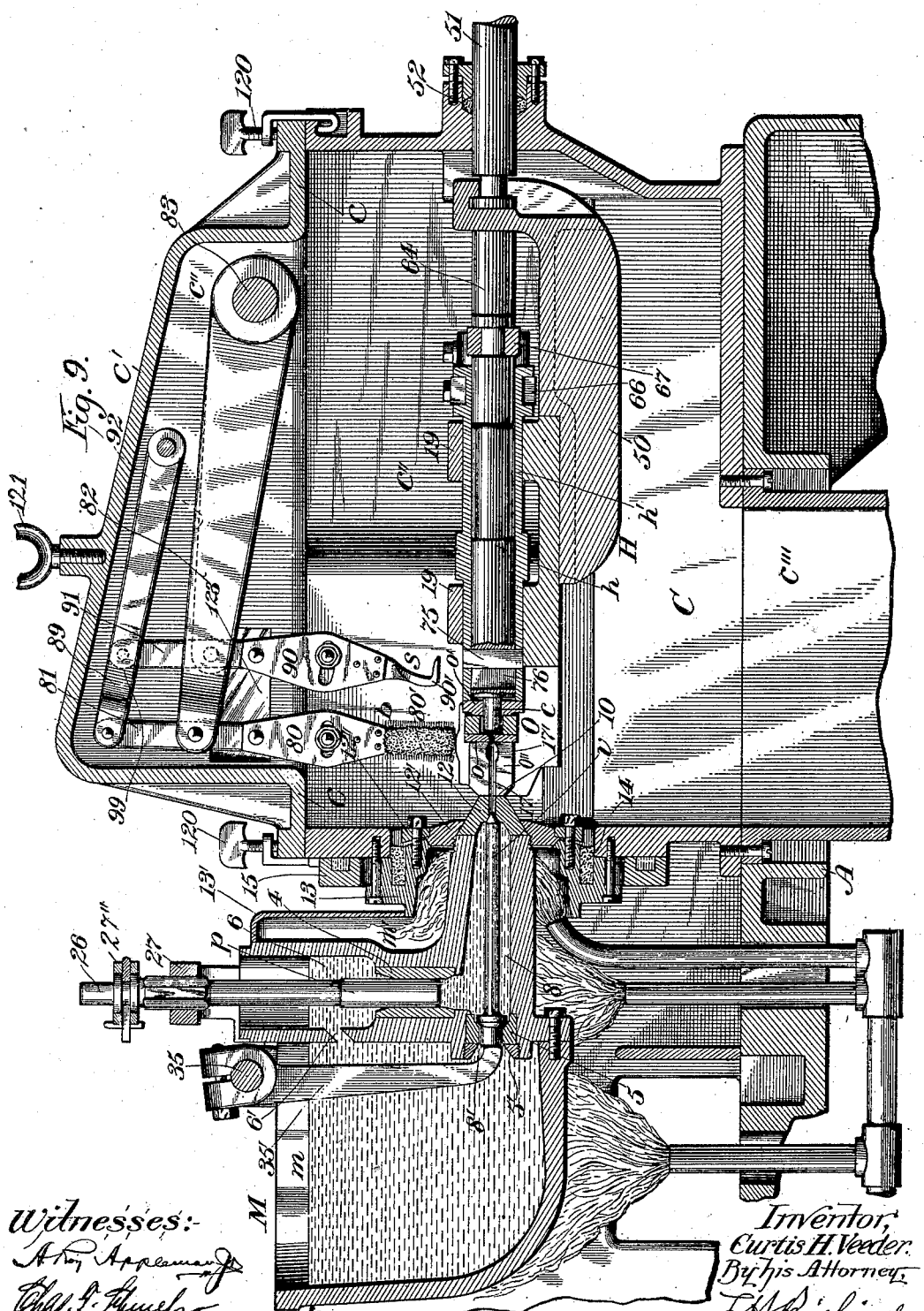
Witnesses:
Inventor,
Curtis H. Veeder.
By his Attorney,
F. H. Richards.

No. 698,591. Patented Apr. 29, 1902.
C. H. VEEDER.
CASTING MACHINE.
(Application filed Feb. 15, 1900.)
(No Model.) 10 Sheets—Sheet 9.

Witnesses:-

Inventor,
Curtis H. Veeder.
By his Attorney,
F. H. Richards.

No. 698,591. Patented Apr. 29, 1902.
C. H. VEEDER.
CASTING MACHINE.
(Application filed Feb. 15, 1900.)
(No Model.) 10 Sheets—Sheet 10.
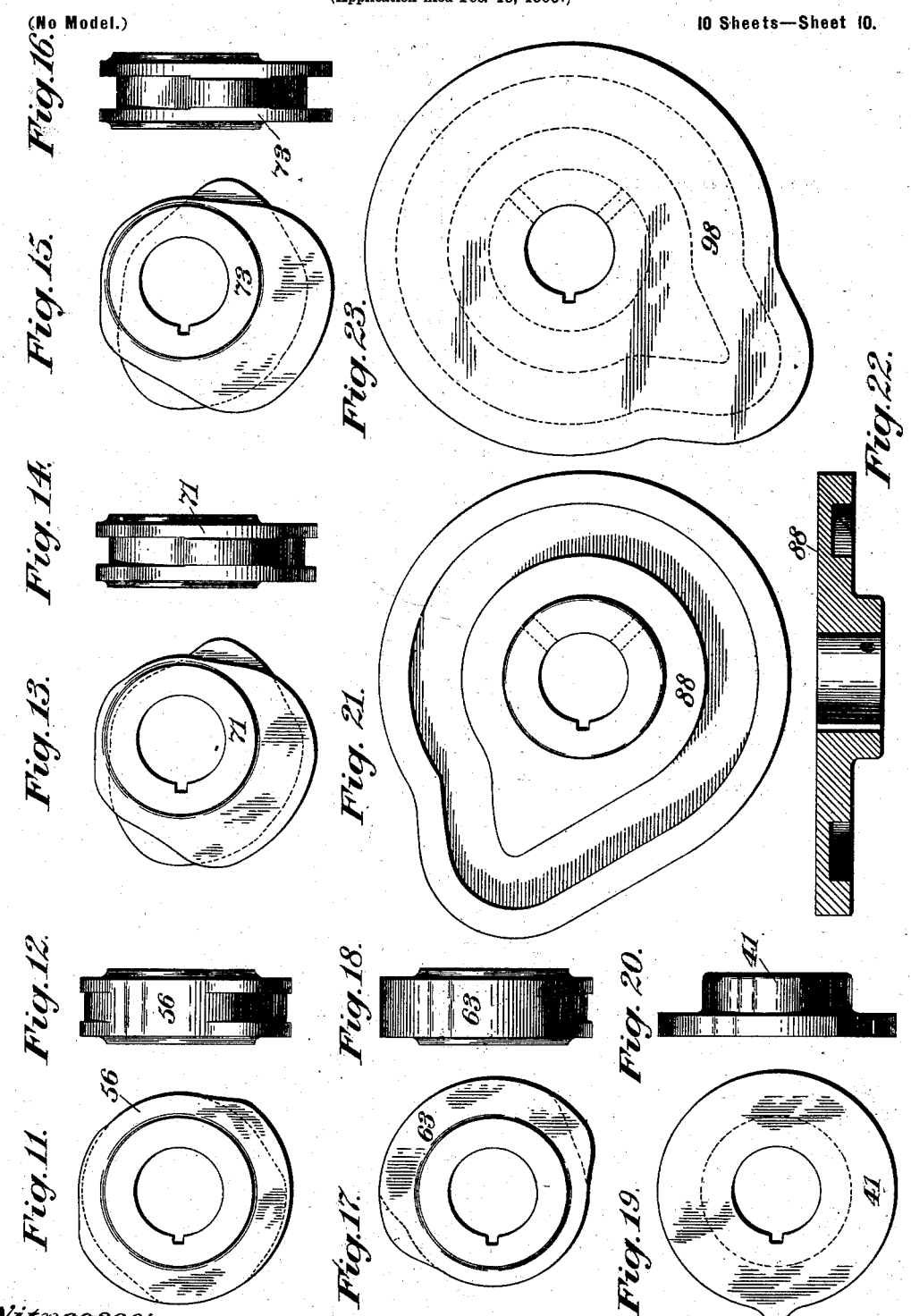
Witnesses:
Inventor:
Curtis H. Veeder.
By his Attorney

UNITED STATES PATENT OFFICE.

CURTIS H. VEEDER, OF HARTFORD, CONNECTICUT.

CASTING-MACHINE.

SPECIFICATION forming part of Letters Patent No. 698,591, dated April 29, 1902.

Application filed February 15, 1900. Serial No. 5,296. (No model.)

*To all whom it may concern:*

Be it known that I, CURTIS H. VEEDER, a citizen of the United States, residing in Hartford, in the county of Hartford and State of Connecticut, have invented certain new and useful Improvements in Casting-Machines, of which the following is a specification.

This invention relates to casting-machines, and has for its main object the provision of a machine for forming dense castings having faces of such smoothness that the castings will not need to be subjected to the usual operations of planing, turning, &c., but can be used and assembled with other parts with the bearing-surfaces in the condition in which they come from the molds and under conditions where exceptionally well-finished bearing-surfaces are required in order to permit the proper movement of parts upon one another. This result I attain by employing a casting-machine so constructed and capable of operating in such a manner as to condense the molten metal most perfectly during the making of the casting and before the completion thereof. I have found that the best results can be secured by producing a vacuum, preferably of the kind known as a "high" vacuum, in the mold into which the metal is to be poured and then forcing molten metal under pressure into the exhausted mold until the mold is completely filled. When castings are formed in this way, all of the spaces and corners of the mold, no matter how small they may be, are completely filled by the molten metal forced thereinto, and the casting corresponds exactly in contour to the mold, every minute projection or indentation in which is reproduced perfectly as an indentation or projection in the finished casting, no matter how complex the pattern to be reproduced may be. Moreover, in every case castings formed in this manner are of a dense, homogeneous, and exceedingly fine crystalline structure throughout.

The present invention is in the nature of an improvement upon the inventions shown, described, and claimed in my applications, Serial No. 738,269, filed November 27, 1899, and Serial No. 2,435, filed January 23, 1900, to which reference may be made. The present invention embodies many important features of novelty not shown in either of said applications, and the machine in which these features are embodied will preferably operate entirely automatically in order that it may make castings at a high rate of speed without requiring any special care from an attendant.

The molten metal may be delivered to the mold in many ways; but I prefer to inject it into the same under high pressure, so that the stream will be forced violently into every portion of the mold. In the present case I have employed for this purpose mold-filling means in which a plunger of relatively large diameter exerts at the proper time a violent pressure upon a column of molten metal which is injected into the mold through a relatively small opening, and hence at a high velocity.

In my prior application, No. 738,269, filed November 27, 1899, I have shown a mold mounted in a vacuum-chamber in such a manner as to be movable therein in different directions, while in my other application, hereinbefore referred to, I have illustrated a mold from which air is exhausted directly. In the present case I have retained the feature illustrated in the first of my prior applications, but in a very much improved form, and in the construction shown herein not only is the mold mounted in a vacuum-chamber, but much of the operating mechanism therefor is also contained within said chamber, the construction being such that the principal operating devices are all inclosed and work within a large chamber from which the air has been exhausted, these operating devices being controlled in this case from a source of power outside such vacuum-chamber.

When the principal operating devices are inclosed in a large vacuum-chamber in the manner just stated, it is desirable to make provision for obtaining access to the interior of the chamber without impairing the vacuum produced therein. The principal practical reason for this is that the castings formed by the machine should be removed from the interior of the vacuum-chamber without stopping the operation of the machine, and any means coacting with this vacuum-chamber which will permit access to be had to the interior of said chamber while the machine is in operation and without impairing the vacuum I consider within the scope of my invention.

Many other features of importance not hereinbefore mentioned will be set forth hereinafter in detail and are clearly illustrated in the drawings accompanying this specification, in which—

Figure 1 is a side elevation of an automatic casting-machine embodying my present invention. Fig. 2 is a plan of the same. Fig. 3 is a transverse section of the same, the section being taken in line $b\ b$, Fig. 5, looking in the direction of the arrow. Fig. 4 is an end elevation of the machine viewed from the left in Fig. 2, parts of the framework being broken away in order to show the construction clearly. Fig. 5 is a substantially central vertical longitudinal section of the machine. Fig. 6 is an enlarged plan of the central portion of the machine with the top of the vacuum-chamber removed and illustrates the principal operating mechanisms with the mold closed. Fig. 7 is a similar view with the mold open. Fig. 8 is an enlarged sectional plan of the central portion of the machine with the cover of the vacuum-chamber removed, the parts being in the positions shown in Fig. 6. Fig. 9 is an enlarged substantially central vertical longitudinal section of the central portion of the machine, with the parts in the positions shown in Fig. 5 and with the mold closed. Fig 10 is a similar view showing the positions of the parts when the mold is open. Figs. 11 to 25, inclusive, are details illustrating cams employed for controlling the movements of the principal mechanisms and devices of the machine. Fig. 26 is an enlarged detail of the yielding rod for the casting-stripper.

Similar characters designate like parts in all the figures of the drawings.

As in the second of my applications, hereinbefore referred to, I have shown herein a complete automatic machine by means of which castings may be formed and ejected from the machine regularly and at a high rate of speed without requiring any considerable amount of attention from an operator.

The several operative parts of my improved machine may be mounted on a suitable framework or bed, such as A, supported on legs in the usual manner and having a main shaft 2, which may be driven by a band-wheel 3 from any suitable source of power, and from this shaft the movements of all of the automatically-operating parts of the machine may be derived.

Any suitable means may be employed for melting and holding the metal from which castings are to be formed; but in the present case I have shown at one end of the framework a melting-pot, (designated in a general way by M.) The contents of this pot may be kept hot in any suitable manner, ordinarily by a gas-jet. In the construction shown this melting-pot has a well 6, opening directly into a chamber 8, having at least two openings leading therefrom. One of these openings is indicated herein by 8' and is intended to receive molten metal from the tank at a point considerably below the surface of the metal and keep the chamber 8 and the lower part of the well—that is, the portion below the piston—filled with molten metal, the upper portion of said well being filled in this case by molten metal entering through an opening 6' near the surface of the molten bath. The other opening in the chamber 8, which opening is designated herein by 10, serves as an outlet through which metal may be delivered to the mold at each operation. The chamber 8 in the present case is formed partly within and partly without the melting-pot M, a nozzle, such as 12, being secured to said melting-pot in the construction shown and being so shaped internally as to contain a portion of the valve-chamber 8 and also the discharge-opening 10. This nozzle may be held in place by a screw-threaded clamping ring or nut, such as 12', and the latter may be secured in position within an opening at the discharge side of the melting apparatus by means of a clamping-ring, such as 12'', secured in place in this instance by means of screw-bolts. These and other parts of the melting apparatus are preferably so constructed as to be readily removable to permit renewal thereof when worn or broken, and in the construction illustrated the plunger, hereinafter to be described, works in a well having a removable sleeve or bushing, such as 4, while the opening 8', through which molten metal passes to the valve-chamber 8, may be formed in an annular seat or bushing 5, which may be held in position by means of a screw-threaded holding ring or nut, such as 5'. Moreover, it will be noticed that the well 6 opens vertically into the chamber 8, and thus serves to permit the escape of air and gas from said chamber, which if it accumulated would tend to reduce the compressing action and form blow-holes. Here the melting-pot M is divided into two main parts, one, $m$, the melting-tank proper, and the other, $m'$, including the well and the valve-chamber, hereinbefore described. This valve-chamber is preferably heated directly by one or more gas-jets, which serve to keep the body of molten metal in such chamber in a state of most perfect fluidity. In order to apply the heat to the valve-chamber and the well to the best advantage, I may employ in connection therewith a casing which may comprise an annular member or shell 13, in which the threaded ring 12' is seated, and a thin casing member or plate, such as 13', adjacent to the wall of the melting-tank.

The mold-filling means is intended to lie partly within and partly without a vacuum-chamber in which the mold will be mounted for movement, and in order to prevent excessive conduction of heat to the walls of said vacuum-chamber I may employ in connection with the shell 13 a heat-insulating ring, such as 14, which may be of asbestos. I may also circulate a cooling fluid, such as water, in contact with a wall of this vacuum-chamber, this circulation being maintained in the present case through a channel in a ring 15, surrounding the member 13. These parts prevent overheating of the walls of the vacuum-chamber and form an air-tight expansion-joint, the parts of which are freely supported between the discharge-nozzle of the mold-filling means and one of the walls of the vacuum-chamber, and hence are freely movable relatively to such associated members and are not held under restraint thereby, the parts of the expansion-joint being movable both lengthwise and crosswise of the longitudinal axis of such discharge-nozzle.

For the purpose of controlling the flow of molten metal to the mold I prefer to mount within the valve-chamber 8 and the openings 8' and 10 a valve so constructed as to close the opening 10 when a casting is not being made. This valve may also serve to open communication through the passage 8' with the main body of metal in the melting-tank, and when so constructed as to accomplish both of these results constitutes a double-action valve.

For the purpose of supplying a charge of metal to the mold I prefer to make use of mold-filling means embodying a member which will act upon the metal in such a manner as to force the molten charge under high pressure into the mold, and thus assure the filling of all corners thereof. Ordinarily a plunger, such as $p$, will work in the well 6, and when depressed will cause the metal to be injected in a small column or stream into the mold.

The plunger $p$ may be carried at the lower end of a plunger-rod 26, which may be mounted for vertical reciprocation in a support or bracket 27, fastened to the upper side of the melting-pot M, said plunger-rod being operated in this case by a cross-bar 27'', removably connected therewith, said cross-bar having pivoted thereto at opposite ends thereof a pair of connecting-rods, such as 29, the lower ends of which are in turn connected to corresponding arms or levers 30' and 30'', secured to a rock-shaft 30. The lever 30' is in this case an angle-lever, the other arm of which is pivoted to a connecting-rod 31, which extends toward the opposite end of the machine and in turn is pivoted to the upper end of a bifurcated lever 31', suitably pivoted on the framework and having a block with a let-off face 31'', adapted to coact with a corresponding quick-let-off face of a cam 33 on the main shaft 2. Said lever 31' has secured thereto one end of a coiled spring 32, the other end of which is fastened to a fixed point and serves to force the plunger $p$ down rapidly when the let-off face 31'' rides down that of the cam 33.

The valve $v$ is intended to reciprocate in the chamber 8 and in the openings 8' and 10, and during a portion of a complete cycle of operations will be controlled in its movements by the molten metal in the valve-chamber and in the main portion of the melting-pot M, and will move back and forth in accordance with the flow of the metal in the one direction or the other; but during another portion of the cycle of operations it is intended in this case that the valve shall be controlled positively and held shut. These parts just described will be so constructed and preferably will so operate that the valve will close the opening 8' immediately after the plunger $p$ begins to descend, and will open the passage 10 to permit the molten metal to enter the mold, whereupon the valve $v$ should be shifted immediately to close said passage and shut off the flow of metal therefrom.

For the purpose of operating the valve $v$ to close the same, as shown in Fig. 9, I may make use of any suitable valve-operating mechanism, but here I have illustrated at 35' a rock-arm carried by a rock-shaft 35, mounted in suitable bearings and also controlled in its movements by the main shaft 2. The connections to this shaft may be any suitable for the purpose, but in this case are somewhat similar to those previously described for operating the plunger. A rock-arm (not shown) secured to this rock-shaft is pivoted, in this instance at its free end, to one end of a connecting-rod 36, the opposite end of which in turn is pivoted to the upper end of a lever 37, substantially similar to the lever 31' and pivoted in a similar manner to the framework. This lever 37 may be bifurcated and may carry an antifriction-roll 37', adapted to cooperate with a cam 41 on the shaft 2, said cam having a small wiper 41' projecting therefrom for shifting the rock-arm 35' away from the valve momentarily when a casting is to be made. A spring 42, connected to the lever 37 and to a fixed point, serves to hold the antifriction-roll 37' in contact with the cam 41 and to operate the rock-arm quickly to close the valve $v$ and cut off the supply of metal to the mold.

An important feature of my present invention is the employment, in connection with mold-filling means and with a separable mold, of mechanism for shifting the mold-sections relatively to each other in different directions at the proper times to open or close the mold, and the mold employed will usually embody end and side sections movable transversely to each other. In practice the walls of the sprue-hole become roughened and coated at the point where the molten metal first enters, and it is very difficult to withdraw the sprue from a solid mold at this point. Hence I prefer to make use of a mold embodying a pair of side sections constituting sprue-forming mold-sections movable toward and from each other, while the body of the casting will be formed by the main portion of the mold, which will usually consist of more than one section, and in the construction illustrated is, in fact, made up of a main section substantially fixed relatively to the sprue-forming mold-sections and to the other sections of the mold and an end section and a core-section movable differentially in the same direction transversely to the paths of movement of the sprue-forming mold-sections.

Many different styles of molds may be employed in connection with my improved machine for forming castings of various shapes so long as the molds differ only in the shapes of the mold-spaces; but in the present case I have illustrated a mold embodying five mold-sections adapted to be separated to the proper extent and in a predetermined order to permit the stripping of the completed casting therefrom. The mold shown is designated in a general way by O and has five mold-sections, two of which may be considered as the main mold-sections and are designated, respectively, by $o$ (here shown made up of more than one part, although its construction may be different) and $o'$, (these main sections constituting end sections in the particular form of mold shown,) two others being sprue-forming side sections and being designated by $o''$ and $o'''$, while the fifth section of the mold is the auxiliary core-section, which is designated herein by $c$. Here the sprue-forming mold-sections are intended to form the usual ingate or sprue-hole 17, which communicates with the opening 10 in the nozzle 12 when the mold is in position to be filled. This sprue-hole is preferably enlarged at a point near the main section of the mold, as indicated herein at 17', in order to permit the formation of a casting having an enlarged sprue adjacent to the body of the casting to facilitate the separation or breaking of the sprue from such body portion.

All of the sections of the mold may be supported by mold-carriers, each mold-section in this case having a separate carrier on which it is supported and by means of which its movements are controlled. Preferably one section of the mold, such as the section $o$, will be mounted on a main mold-carrier or mold-carriage properly guided on the framework for movement toward and from the discharge-nozzle of the mold-filling means, and all of the other sections of the mold may be supported most advantageously by auxiliary mold-carriers mounted on and guided in their movements by the main mold carrier or carriage in order that all of the various mold-sections may be positively located and guided during the movements thereof. Here the main mold-section, which may be made up of several parts, is fastened directly to the main mold-carrier, which will preferably be in the form of a carriage or slide, such as H, movable lengthwise of the machine and properly guided by ways thereon, this carriage being in the present case a substantially T-shaped slide open at one end thereof and having guideways therein in which the several auxiliary mold-carriers may be mounted for reciprocation. Of course this carriage may be made up of a number of parts, and, in fact, it has been found advantageous to mount the auxiliary mold-carriers in guideways in divided collars or bearings, such as 18, 18', and 19. All of these mold-sections may be supported by cylindrical auxiliary mold-carriers mounted for reciprocation on the main slide or carriage lengthwise and crosswise of the latter, two of these auxiliary mold-carriers, such as $h''$ and $h'''$, supporting in this case the side sections or sprue-forming sections $o''$ and $o'''$ of the mold, while a tubular carrier $h'$ may support the mold-section $o'$, and a cylindrical carrier $h$ within the tubular carriage $h'$ may support the core $c$ of the mold.

The mold-carriers, and hence the mold-sections operated thereby, may be actuated in any suitable manner; but as one of the principal features of my present invention is the employment of a casting-machine in which the mold and much of its operating mechanism are contained within a vacuum-chamber and go through their cycles of operations in such chamber while the latter is exhausted I prefer to employ, in connection with the mold and the mold-filling means, operating means controlling the movements of some portion or portions of the mechanism within the vacuum-chamber and preferably controlled in turn from a point without said chamber, which is designated herein in a general way by C. In the present case I have deemed it desirable to employ in connection with an operated member within the vacuum-chamber, which operated member may be a mold-carrier or any other suitable part of the mechanism, an operating member working in an opening in a wall of the vacuum-chamber, a proper air-tight packing being interposed between this operating member and the walls of the opening in said chamber in order to prevent leakage of air thereinto. The employment in a casting-machine of a vacuum-chamber in which the principal members of the mechanism for forming and stripping a casting are located is an important feature of my present improved machine, as it permits the maintenance of an almost perfect vacuum within such chamber during all of the various stages of each cycle of operations of the mechanism. Hence in such a construction as the mold-sections close together while located in an exhausted space the mold-space itself will of course be an exhausted one before the mold-sections are closed. When these various mold-sections or other parts located within the vacuum-chamber are operated by mechanical connections from a point without the chamber, it of course becomes necessary to provide means for permitting the movement of certain operating members in the walls of such chamber and yet prevent leakage of air into the latter through the openings in which such operating members work, and as this is also a matter of great practical importance I consider within the scope of my invention any casting mechanism in which one or more of the operated members within the vacuum-chamber are controlled by operating means working in an opening or openings in the walls of the vacuum-chamber in such a manner as not to impair the vacuum therein.

In the construction shown the main carriage H may have secured to the rear end thereof an arm, such as 50, to which may be connected an operating member or rod 51, detachably secured thereto and working in an opening in the wall of the vacuum-chamber C, a suitable air-tight packing, such as 52, being interposed between said rod and the walls of such opening in order to prevent admission of air into said chamber. This operating member 51 is intended to be controlled in its operation by the main shaft 2 and in this case is pivotally connected to a spring-pressed rod or eyebolt 53, preferably adjustably secured to the upper portion of a swinging frame, (designated in a general way by $f$.) This frame may be of any suitable construction, but in this case embodies two pairs of levers, such as 54, pivoted on the fixed shafts or rods 38 and 38' and properly spaced by washers, such as 54'. At the upper ends thereof these levers 54 are pivoted to a block, such as 54'', which may be of composite construction, and has a lug, such as 54''', rising therefrom, through which the bolt 53 is passed and with which it is adjustably connected to regulate the movements of the carriage H. In this case each pair of levers 54 carries an antifriction-roll 55, and these rolls are intended to coact with a cam 56, secured to the main shaft 2, the advancing and retreating movements of the carriage H being effected by the swinging of the frame $f$, while the spring 53' tends to force the carriage toward the discharge-nozzle of the mold-filling means when the mold is closed.

The mold-carriers $h''$ and $h'''$ for the sprue-forming mold-sections $o''$ and $o'''$ may be operated by connections similar to those just described for operating the carriage H. In the present case said carriers are pivotally connected with a pair of angle-levers, such as 57 and 57', by means of short links 58 and 58', said angle-levers being in turn pivoted, preferably adjustably, to connecting-rods, such as 59 and 59', these connecting-rods being in this case adjustable by means of turnbuckles 59'' therein and being pivoted to operating members or rods, such as 60 and 60', passed through openings in a wall of the vacuum-chamber C in substantially the same manner as is the operating member 51, said rods 60 and 60' being pivoted to spring-pressed rods or eyebolts 61 and 61', similar to that shown at 53. These bolts 61 and 61' are connected to swinging frames $f''$, substantially similar in most respects to that shown at $f$, except that the lugs through which the bolts 61 and 61' pass are nearer the mold than is the lug on the frame $f$. Moreover, the springs 61'' 61'', surrounding the bolts 61 and 61', normally tend to force said bolts to the right, as seen in Fig. 2, while the spring 53' tends to force its bolt to the left, as seen in said view. The swinging frames $f''$ are operated by cams coacting with antifriction-rolls in substantially the same manner as hereinbefore described with reference to the frame $f$. Here antifriction-rolls, such as 62 and 62', coact with corresponding cams, such as 63 and 63', (see Fig. 4,) on the main shaft 2 to operate said frames $f''$, and hence the mold-carriers $h''$ and $h'''$, at the proper times. Both of these cams may be of the construction shown in Figs. 17 and 18. From each of the other two mold-carriers $h$ and $h'$ I deem it advantageous to make a more direct connection to the operating members therefor, and in the present instance each of these carriers is controlled by a forked arm secured to an operating member working in an opening in a wall of the vacuum-chamber C. Here these operating members are in the form of rods 64 and 65, similar to the others hereinbefore described, and each of said rods is preferably screw-threaded at its inner end to receive a divided collar and permit adjustment of a forked arm adapted when properly adjusted to be firmly clamped in place on its operating-rod. These forked arms are designated herein by 66 and 67, respectively, and span reduced portions, which may be formed by grooves in the rear ends of the carriers $h$ and $h'$, as clearly shown in Fig. 8. These operating-rods 64 and 65 are also intended to be controlled directly by the shaft 2, and the connections between said rods and the shaft may be substantially the same as those before described with reference to the main carriage and the mold-carriers for the sprue-forming side sections of the mold. Here said operating-rods 64 and 65 are pivoted, respectively, to spring-pressed connecting-rods or eyebolts, such as 68 and 69, which in turn may be connected to swinging frames, such as $f'$ and $f'''$, constructed and operating substantially in the same manner as the other swinging frames hereinbefore described. Here the frame $f'$ has antifriction-rolls, such as 70, which coact with a cam 71 on the shaft 2, while the swinging frame $f'''$ has corresponding antifriction-rolls 72, which coöperate with a cam 73 on said shaft. It will be apparent that the springs on the rods 68 and 69 should operate in the same way as the spring 53'—that is to say, they should tend to press their operating members 64 and 65 inward toward the mold instead of tending to pull them outward away from said mold, as is the case with the rods 60 and 60'.

Of course the core-carrier or core-rod $h$ should be capable of moving relatively to the auxiliary mold-carrier or shell $h'$, and in this case the shell has a pin 75, which passes through a corresponding slot 76 in the core-rod $h$ (see Figs. 8 and 9) and serves to guide the core-rod and determine the range of movement thereof.

It will be evident that all of the various connections between the shaft 2 and the mold-sections may be positively controlled in their positions and movements by means of the various adjustments hereinbefore referred to and clearly shown in the drawings. Hence the positions of the mold-sections may be positively determined and the perfect closing of the mold and the opening of the same to the proper extent assured. Not only are these mold-sections positively held together and the mold firmly held against the face of the discharge-nozzle of the mold-filling means, but the springs surrounding the operating members that pass through the walls of the vacuum-chamber serve as means for exerting upon the mold-sections during the filling of the mold separate and continuous pressures in directions transverse to each other, two of the springs pressing in one direction to hold the sprue-forming side sections of the mold together, while the other springs operate in the opposite direction and serve to force the carriage, the core-rod, and the shell toward the discharge-nozzle with varying pressures and in a path perpendicular to the paths of movement of the side sections. The operations of these parts are so timed that after a casting has been formed the sprue-forming mold-sections $o''$ and $o'''$ will open first, after which the shell and the core-rod will withdraw simultaneously from the main section $o$, and thereafter the core-rod will withdraw still farther to the position shown in Fig. 10, it being understood, of course, that before any of the mold-sections separate the mold as a whole should be withdrawn, at least to a slight distance, from the discharge-nozzle of the mold-filling means, the movement of the main carriage H serving to effect this result. It will be evident, therefore, that not only do I make use of a separable mold embodying a plurality of mold-sections, but that in connection therewith I employ mold-separating mechanism for shifting said mold-sections in different directions to open the mold and effect the stripping of the casting therefrom. Ordinarily a pair of side sections—in this case the sprue-forming sections of the mold—will be shifted simultaneously in opposite directions, and thereafter one or more end sections will be shifted in a different direction, these end sections, if there is more than one, being shifted different distances in such direction. This mold-separating mechanism is intended to coöperate with certain other elements in the construction shown in the present case, and one of these elements is a sprue-separating device for parting the sprue and the casting, this device being effective only after the sprue-forming mold-sections have been opened, and hence after the mold-separating mechanism has operated to separate these particular sections of the mold.

The sprue-separating device may be of any suitable construction; but I prefer to make use of one by means of which the sprue and the body of the casting will be parted by breaking the former at a point close to the latter, and a sprue-separating device of this type is shown herein. Said device is designated in a general way by $b$, and is also located within the vacuum-chamber C, and will preferably be operated from the main shaft 2 without said chamber. Hence the operating member, which passes through a wall of said vacuum-chamber, should have an air-tight packing interposed between it and the walls of such opening. Usually this sprue-separating-device will have a hard central operating end for breaking the sprue from the body of the casting and an outer brush-like portion serving as a means for cleaning the cheeks of the mold-sections, and hence said member serves as a combined sprue-separating device and mold-cleaning means. In this case it consists, essentially, of a working portion 80', having a brush-like surface, the working portion being carried by a body 80 in the form of an adjustable plate pivoted on an arm 81, secured to a rock-arm 82, adapted to vibrate in an upward extension of the vacuum-chamber formed in a recess $c'$ of the vacuum-chamber cover-plate. This rock-arm is fixed to a rock-shaft 83, which passes through the wall of the vacuum-chamber and through an air-tight packing 83', and carries at its outer end a long rock-arm 85, from which a connecting-rod 86 passes to a lever 87, mounted on the fixed shaft 38', and having a roll portion (not shown) adapted to enter the cam-groove of a cam 88, secured to the main shaft 2. The arm 81 of the device just described may be guided in its movements by means of a link 89, pivoted within the vacuum-chamber C and movable substantially in parallelism with the rock-arm 82.

In connection with the device just described I deem it desirable to employ a casting-stripper which may be constructed and may operate in substantially the same way, except that while the sprue-separating device is movable in a path between the sprue-forming mold-sections the casting-stripper is intended to move in a path between the main sections of the mold by which the body of the casting is formed. The casting-stripper is designated in a general way by $s$ and in the construction shown embodies a hook-shaped stripping member 90', secured to an adjustable body or plate 90, pivoted on a carrier-arm 91, pivoted in turn to a rock-arm 92, secured to a rock-shaft 93, journaled in bearings in substantially the same manner as and in alinement with and forming a continuation of the rock-shaft 83, said shaft 93 passing through a stuffing-box 93' in the wall of the vacuum-chamber C and having at its outer end a rock-arm 95, similar to that shown at 85. This rock-arm 95 is in this case pivoted to a connecting-rod 96, the other end of which is pivotally connected to a lever 97, mounted on the shaft 38', and having a roll portion (not shown) adapted to work in the cam-groove of a cam 98, secured to the main shaft 2. The rod 96 is made in two parts, as shown in Fig. 26, having stops 96'' and 96''', respectively, with a compression-spring 96' between them in order to permit the rod to yield should the casting in descending strike an obstruction, such as an improperly-adjusted mold-section. Said rod will of course be rigid when it raises the stripper and will positively operate the latter. The arm 91 of the casting-stripper may also be guided in its movements by means of a link 99, pivoted thereto and to the inner side of the vacuum-chamber C, said link being movable substantially in parallelism with the rock-arm 92. Hence the casting-stripper and its operating connections are actuated in substantially the same manner as the combined sprue-separating device and brush and the operating connections therefor; but it should be understood that the devices $b$ and $s$ are successively effective in that order, owing to the fact that the sprue-forming mold-sections will separate before the main sections of the mold are opened.

Another feature which I deem of importance is the employment, in connection with the devices hereinbefore described, of means for scraping off metal which sometimes adheres very firmly and becomes soldered to those portions of the mold which come in contact with the nozzle. In order to remove this metal and assure a tight joint and prevent clogging, I have employed a pair of fixed scrapers mounted on the carriage H and in position to scrape the cheeks of the sprue-forming mold-sections when the latter are separated. These fixed mold-scrapers, which are designated herein by 100, are disposed oppositely to each other in a common plane in such positions that when the sprue-forming mold-sections are separated the forward cheeks of the latter will move across the edges of the mold-scrapers, and any particles of cast metal which may have adhered to the mold-sections will be scraped off to enable the sections to close tightly against the face of the discharge-nozzle when another casting is to be formed.

In the second of my prior applications hereinbefore referred to I have illustrated means for preventing the filling of the mold except where the mold and all of its various sections are in their proper positions relative to the mold-filling means and to one another, and in the present case I have shown an improved safety device for accomplishing the same result. The device which I now employ is an electrically-controlled one and is much more sensitive in operation than the one described in said prior application. In this case I employ in connection with the mold, the mold-filling means, and the operating mechanism for positioning one of these elements relatively to the other an electromagnetic safety device which coöperates with such positioning mechanism and is effective reciprocally therewith—that is to say, when the mechanism for positioning one of such elements is not effective for locating the same properly the safety device will be effective for preventing the introduction of molten metal into the mold, and, vice versa, when the positioning mechanism is effective for locating the aforesaid element or elements properly the safety device will not be effective to block the operation of the mold-filling means, but will permit the latter to inject the molten metal into the mold to form the casting.

The means which I employ in the present case for preventing waste of molten metal is an electric circuit controlling this safety device and having one or more normally open breaks adapted to be closed by the proper positioning of the mold and the mold-filling means relative to each other. The conductors 107 and 108 are preferably insulated, especially where they are supported on the mold-sections, except at the contact ends thereof. Here I have shown an electric circuit having two normally open breaks adapted to be closed by four of the mold-sections, the two sprue-forming mold-sections serving to close one of said breaks, as shown in Figs. 6 and 7, while the main section $o$ and the end section $o'$ of the mold serve to close the other break. In the specific construction shown I have illustrated a battery $b'$, from which a conductor 105 passes to the electromagnet 106 of an electromagnetic safety device, (designated in a general way by $e$,) and from this electromagnet another conductor 107 passes to the mold-section $o'''$, which has a contact-face in the plane of the meeting faces of the mold-sections $o''$ and $o'''$. This contact-face is adapted to make contact with a corresponding contact-face on the mold-section $o''$, from which a short conductor 108 leads to the mold-section $o$, the contact-face on the conducting-wire being adapted in this case to be received in a shallow recess 109 in the mold-section $o'$ in electrical communication with a contact-post 110 on the framework, from which a short conductor 112 passes to a switch 113, the switch-arm 113' of which is connected by means of another short conductor 114 to the other pole of the battery $b'$. The switch 113 may have a pair of stop-pins for limiting the movements of the switch-arm.

It will be apparent now that so long as the mold-sections are not fully closed the circuit will not be closed, and hence an electromagnetically-controlled locking device, such as the armature 115, having the usual governing-spring $s$ and serving to control the operation of the plunger $p$, will not be attracted by the electromagnet, but will serve to block the operation of the plunger-operating mechanism and in this case will lie in the path of a stop 116 on the rod 31, while when said electromagnet is energized said pawl 115 will be withdrawn from the path of movement of such stop and will permit the spring 32 to operate said connecting-rod 31 and through it the plunger $p$. (See Fig. 1.)

It will be apparent from the foregoing that the employment of a vacuum-chamber in which the mold and the other principal coöperating parts are located is one of the most important features of my present invention. This vacuum-chamber may be of any suitable construction and of any proper size, provided that it is large enough to receive the various operating parts which are intended to be contained therein, and it should be so constructed as to prevent leakage of air thereinto at those points where operating parts of the mechanism pass through the walls of the chamber. Usually this vacuum-chamber will be a large one, occupying substantially the whole central portion of the machine, and it may be made in several parts, the present construction illustrating a two-part casing closed by a removable cover. This cover is designated in a general way by $c$ and the upper and lower portions of the chamber by $c''$ and $c'''$. (See Figs. 3, 4, and 5.) The upper and lower portions of the vacuum-chamber may be permanently connected by means of screw-bolts or in any other suitable manner; but the cover $c'$ should be readily detachable from the upper portion $c''$ of said vacuum-chamber, and hence the cover may be held in place most advantageously by means of screw-clamps, such as 120, which when screwed tight will seal securely the joint between the cover and the section $c''$. As this cover is quite heavy in a full-sized machine, it will be found desirable to provide a screw-eye, such as 121, by means of which the cover may be lifted. It should be understood, of course, that the vacuum-chamber should be exhausted as completely as possible before the machine begins to operate, the chamber being exhausted ordinarily through a pipe, such as 122, by means of an exhaust-pump. (Not shown.) In order to observe the operation of the mechanism, large sight-openings may be formed in the walls of the chamber C, preferably in the cover $c'$, and these openings will have transparent air-tight closures, such as 123.

When castings are formed in a mold located within a vacuum-chamber, it will be evident that provision should be made for effecting the removal or discharge of the completed castings from the vacuum-chamber from time to time without impairing the vacuum in such chamber. In order to accomplish this result, I have made use herein of casting receiving and discharging means which will control an opening in a wall of the vacuum-chamber and will always seal said opening, so as to prevent the admission of air into the chamber, and yet will serve alternately to receive castings and discharge the same from the vacuum-chamber. This vacuum-maintaining means for receiving and discharging the castings will preferably employ a liquid seal for closing the opening through which the castings are delivered from the vacuum-chamber and will ordinarily be in the form of a large valve controlling a correspondingly large outlet-opening from the vacuum-chamber, which opening will usually be located directly below the mold in order that the castings may drop by gravity. Moreover, in order to prevent injury to the castings the casting-receiving means will ordinarily have a chamber in one side thereof containing water or other liquid, into which the castings may fall without being injured. In the present case this casting receiving and discharging means is in the form of a large plug-valve, such as V, having a chamber open at one side only and of considerable size in order that it may receive a large number of castings before the contents are discharged. This casting-receiving chamber is designated by 125, and its open side is of substantially the same size as the open lower end of the chamber $c'''$, with which it communicates. This valve or barrel may fit its seats somewhat tightly and should be so inclosed as to prevent any leakage of air into the vacuum-chamber at this point. This result I accomplish in the present case by providing at opposite ends of the valve a pair of caps, one of which may completely inclose one end of the valve, while through the other the valve-stem may project, a suitable air-tight packing being interposed between the valve-stem and the walls of the opening in such cap. Here the cap through which the valve-stem 125' projects is designated by 126, while the other cap is indicated at 127, a stuffing-box 128 being interposed between the valve-stem 125' and the opening in the cap 126. This valve may be adjusted toward or from its seats by means of a stem 125'', having adjusting and check nuts thereon, the opening through which said stem projects being securely sealed by a small screw-cap, such as 129. A hand-wheel, such as 130, may be mounted on a stem 125' in order to permit the turning of the member V to its casting-receiving and casting-discharging positions alternately. Moreover, as it is desirable to prevent the unsealing of the lower end of the vacuum-chamber I prefer to make use of means for positively limiting the oscillatory movements of the casting-receiving means, and for this reason I have shown at 125''' a stop projecting from the valve and adapted to coöperate with another stop 126' on the inner side of the cap 126, these stops being so positioned and of such size as to limit the oscillations of the barrel to an arc considerably less than a complete circle. The reason for this will be apparent by referring particularly to Fig. 3, from which it will be seen that the vacuum-chamber has at its open lower end a pair of cut-off faces 135 and 136, with which the solid portion or cut-off face of the valve V coöperates, and that if the barrel V were permitted to turn to the left from the position shown in Fig. 3 the opening would almost immediately be unsealed and the vacuum in the chamber C destroyed as soon as the edge of the opening passed below the lower edge of the cut-off plate 135, when the atmospheric pressure on the water in the receptacle R would force the water and air up into the vacuum-chamber to balance the pressures inside and outside said chamber. When, however, the barrel is turned to the right from the position shown in said figure, the casting-containing member may be oscillated through a very large arc to a point where its contents will be discharged, and this will take place while the opening between the upper ends of the cut-off faces 135 and 136 is entirely sealed by the cut-off face of the valve V.

Of course it will be apparent that whether a water-cushion is employed to check the fall of the castings and prevent injury thereto and to form at the same time an air-tight seal for the opening at the lower end of the vacuum-chamber is immaterial, provided that the parts coöperate to prevent leakage of air into the chamber C. It is preferable, however, to employ this water seal and also to make use of a receptacle, such as R, into which the castings in the chamber 125 may be discharged, it being obvious that when this receptacle is filled to the proper height the valve in turning from its discharging position to the position shown in Fig. 3 will always carry with it a sufficient quantity of the water to form a water-cushion to check the descent of the falling castings as they are formed. The surplus water which accumulates above the valve V may be withdrawn through a pipe 138 by a pump. (Not shown.) A wire basket, such as 137, may be placed in the bottom of the receptacle R to receive the castings discharged from the chamber 125 and permit the removal thereof. It will be understood that the member V should be oscillated to its casting-discharging position only at the times when castings are not being formed, as if this were not the case the castings would strike against the cut-off face of the receiving member and might be damaged. In light castings and those made from alloys which water would injure a water seal need not be used.

The operation of a machine constructed in accordance with my present invention, as herein shown and described, is as follows: It being understood that all of the parts are in condition for operation, that the vacuum-chamber C has been exhausted, that the casting-receiving member V is in the position shown in Fig. 3, and that the mold is open, as shown in Fig. 7, the machine will be started and the band-wheel 3 will be turned in the direction of the arrow shown in Fig. 1. Thereupon the cam 73 will become effective and through its operating connections will move the core c forward toward its closed position. Immediately thereafter the cam 71 will begin to move the shell h' and the mold-section o' forward in the same manner by means of the operating connections between said cam and this end section of the mold. The cams 63 and 63' will then become effective to operate the connections to the sprue-forming mold-sections o'' and o''' and the latter will begin to close, after which the cam 56 will come into action and through its connections to the carriage H will shift the latter forward toward the face of the discharge-nozzle 12. The sprue-forming mold-sections o'' and o''' will reach their closed positions before the others and will close one break in the circuit controlling the operation of the safety device for preventing improper operation of the mold-filling means, and this safety device, it should be understood, will at this time be in position to block the descent of the plunger p. (See Fig. 1.) After the side sections of the mold close the core c and the end section o' will also close upon the main section o of the mold practically simultaneously, and immediately thereafter the carriage will reach the limit of its forward movement, and the forward faces of the mold-sections o'' and o''' will be pressed firmly against the face of the discharge-nozzle 12, it being understood that at this time all of the springs surrounding the connecting-rods pivoted to the operating members that pass through the walls of the vacuum-chamber will be exerting their forces upon the several sections of the mold and the carriage H and that the mold-sections will be pressed together and into close contact with the face of the discharge-nozzle by the continuous but independent and differential pressures exerted by the respective springs. On the proper closing of the end section o' of the mold the second break in the electric circuit to the safety device will be closed and the electromagnet 106 will attract its armature and withdraw the stop-face thereof from the path of movement of the stop 116 on the connecting-rod 31. The cam 41 on the shaft 2 will then become effective to operate the rock-arm 35' through the connections thereto and will permit the valve v to open the passage 10, so that molten metal may be forced into the mold by the plunger p, if the pawl 115 is out of the path of the stop 116. If these parts are properly positioned, the let-off face 31'' of the lever 31' will ride down the let-off face of the cam 33 immediately after the rock-arm 35' is drawn back to permit the opening of the valve v, and when said let-off face on the lever passes the corresponding face on the cam 33 the spring 32 will force the plunger p down and a charge of molten metal will be forced into the mold O and will fill the same. Of course the valve v opens the passage 10 only long enough to permit the charge to be forced into the mold, and said passage is closed almost immediately, and the plunger after reaching the limit of its downward movement begins to rise again. All of the sections of the mold remain in their closed positions long enough for the casting to cool properly, whereupon the cams 56, 71, and 73 through their operating connections begin to withdraw the mold-carriers H, h', and h, and the latter simultaneously begin to move slowly in unison away from the nozzle 12. During this movement the cams 63 and 63' become effective to separate the sprue-forming sections o'' and o''' of the mold, and these sections are rapidly separated and reach their wide-open positions at substantially the same time that the carriage reaches the limit of its rearward movement. At about this time the cam 88 becomes effective to force the combined sprue-separating device and mold-cleaning brush b downward, and this device descending quickly between the open sections o'' and o''' of the mold breaks the sprue at a point adjacent to the body of the casting and after reaching the limit of its downward movement rises slowly in order that it may clean the mold-sections thoroughly. After the carriage reaches the limit of its rearward movement the cam 71 continues to operate the shell h' and the mold-section o' withdraws the body of the casting from the mold-section o, so that the casting will clear the latter, this shell therefore having a continued movement relative to the carriage after the latter has reached its extreme rearward position. The core c is then stripped from the casting by a continued rearward movement relative to the shell and to the carriage, this continued movement of the core being effected by the last portion of the cam-face of the cam 73. The core reaches its extreme rearward wide-open position with respect to the other sections of the mold at about the same time that the brush reaches its extreme upward position after cleaning the mold-sections. During the last part of the movement of the core the casting-stripper s descends quickly and, striking the body of the casting, strips the latter from the face of the end section o' of the mold, if said casting has not already dropped into the casting-receiving member at the bottom of the vacuum-chamber. This casting-stripper is almost immediately withdrawn from between the mold-sections, and after it rises to the limit of its upward movement the parts will be in positions to go through a new cycle of operations. Of course as soon as the sprue-forming sections of the mold separate the electric circuit will be broken and the safety device will return to its blocking position.

Having described my invention, I claim—

1. In a casting-machine, the combination with means for subjecting a mass of molten metal to a pressure greater than atmospheric, of an outlet-nozzle through which molten metal is discharged; a shiftable mold; a vacuum-chamber in which the mold is located; means for advancing the mold to a position when a casting is to be made in which it contacts with the nozzle, and for withdrawing it therefrom; a valve independent of the mold for controlling the entrance of molten metal thereto; means for exhausting said vacuum-chamber and thereby exhausting the space extending from the valve to the bottom of the mold-space proper and through and into which the molten metal passes during its flow; a power-driven device in the machine, and mechanism operatively connected with such device for actuating the means for advancing the mold, thereby causing same to assume a casting position; then actuating the valve to admit molten metal under pressure to the exhausted mold and subsequently shut off all communication of the metal therewith, and finally actuating the means for withdrawing the mold, thereby withdrawing the mold from its casting position.

2. In a casting-machine, the combination with means for subjecting a mass of molten metal to a pressure greater than that of atmospheric, of a shiftable mold; a vacuum-chamber in which the mold is located; a stuffing-box in a wall of the vacuum-chamber; a mold-actuator extending through the stuffing-box; a valve independent of the mold for controlling the entrance of molten metal thereto; means for exhausting the vacuum-chamber and thereby exhausting the space extending from the valve to the bottom of the mold-space; a power-driven device in the machine, and mechanism operatively connected with such device for actuating the mold-actuator, thereby causing the mold to assume a casting position; then actuating the valve to admit molten metal under pressure to the exhausted mold, and subsequently shut off all communication of the metal therewith, and finally again actuating the mold-actuator to withdraw the mold from its casting position.

3. In a casting-machine the combination with a melting-tank and an outlet-nozzle through which molten metal is discharged, of a well communicating with said tank; a plunger for subjecting molten metal therein to pressure; a valve device embodying a pair of valve parts for simultaneously closing communication between the well and the melting-tank and opening the passage through the nozzle, and vice versa; a shiftable mold; a vacuum-chamber in which the mold is located; means for advancing the mold to its casting position and for withdrawing it therefrom; means for exhausting the vacuum-chamber and thereby exhausting the space extending from the valve part controlling the passage through the nozzle, to the bottom of the mold-space; a power-driven device in the machine, and mechanism operatively connected with such device for actuating the means for advancing and withdrawing the mold, the plunger and the valve device in proper order.

4. In a casting-machine, the combination with a melting-tank and an outlet-nozzle through which molten metal is discharged, of a well communicating with said tank; a plunger for subjecting molten metal therein to pressure; a valve device embodying a pair of valve parts for simultaneously closing communication between the well and the melting-tank, and opening the passage through the vessel, and vice versa; a shiftable mold; a vacuum-chamber in which the mold is located; means for advancing the mold to a position when a casting is to be made, in which it contacts with the nozzle, and for withdrawing it therefrom; means for exhausting the vacuum-chamber and thereby exhausting the space extending from the valve part controlling the passage through the nozzle, to the bottom of the mold-space; a power-driven device in the machine, and mechanism operatively connected with such device for actuating the means for advancing and withdrawing the mold, the plunger and the valve device in proper order.

5. In a casting-machine, the combination with means for subjecting a mass of molten metal to a pressure greater than atmospheric, of an outlet-nozzle through which molten metal is discharged; a shiftable mold embodying a plurality of mold-sections movable different distances; a vacuum-chamber in which the mold is located; means for advancing the mold to a position, when the casting is to be made, in which it contacts with the nozzle, and for withdrawing it therefrom; a valve independent of the mold for controlling the entrance of molten metal thereto; means for exhausting such vacuum-chamber and thereby exhausting the space extending to the bottom of the mold-space; a power-driven device in the machine, and mechanism operatively connected with such device for actuating the means for advancing the mold, thereby causing the mold to assume a casting position; then actuating the valve to admit molten metal under pressure to the exhausted mold, and subsequently shut off all communication of the metal therewith; then actuating the means for withdrawing the mold thereby withdrawing the mold from its casting position, and for finally separating the mold-sections one from another.

6. In a casting-machine, the combination with a melting-tank, and an outlet-nozzle through which molten metal is discharged, of means for subjecting a mass of molten metal to a pressure greater than atmospheric; a shiftable mold; a vacuum-chamber in which the mold is located; a stuffing-box in the wall of the vacuum-chamber; a mold-actuator extending through the stuffing-box; a valve independent of the mold for controlling the entrance of molten metal thereto; means for exhausting the vacuum-chamber and thereby exhausting the space extending from the valve to the bottom of the mold-space; a main shaft; and a series of cams operatively connected to the shaft and with the means for subjecting the molton metal to pressure, the mold-actuator and the metal-controlling valve, and which actuate the same in the following order, namely; first the mold-actuator to shift the mold into its casting position, then the metal-controlling valve, and the means for subjecting the metal to pressure to admit molten metal under pressure to the exhausted mold, and again and finally the mold-actuator to withdraw the mold from its casting position.

7. In a casting-machine, the combination with a melting-tank, and an outlet nozzle through which molten metal is discharged, of means for subjecting a mass of molten metal to a pressure greater than atmospheric; a shiftable mold embodying a plurality of mold-sections movable different distances; a vacuum-chamber in which the mold is located; a stuffing-box in the wall of the vacuum-chamber; a mold-actuator extending through the stuffing-box; a valve independent of the mold for controlling the entrance of molten metal thereto; means for exhausting the vacuum-chamber and thereby exhausting the space extending from the valve to the bottom of the mold-space; a main shaft; and a series of cams operatively connected to the shaft and with the means for subjecting the molten metal to pressure, the mold-actuator and the metal-controlling valve, and which actuate the same in the following order, namely; first the mold-actuator to shift the mold into its casting position, then the metal-controlling valve and the means for subjecting the metal to pressure to admit molten metal under pressure to the exhausted mold, and again and finally the mold-actuator to withdraw the mold from its casting position and separate the sections thereof one from the other.

8. In a casting-machine, the combination with means for subjecting a mass of molten metal to a pressure greater than that of atmospheric, of an outlet-nozzle through which molten metal is discharged; a shiftable mold embodying a pair of side sections movable in different directions; a vacuum-chamber in which the mold is located; means for advancing the mold to a position, when a casting is to be made, in which it contacts with the nozzle, and for withdrawing it therefrom; a valve independent of the mold for controlling the entrance of molten metal thereto; means for exhausting said vacuum-chamber and thereby exhausting the space extending to the bottom of the mold-space; a power-driven device in the machine, and mechanism operatively connected with such device for actuating the means for advancing the mold, thereby causing the same to assume a casting position; then actuating the valve to admit molten metal under pressure to the exhausted mold, and subsequently shut off all communication of the metal therewith; then actuating the means for withdrawing the mold, thereby withdrawing the mold from its casting position, and for finally separating the said side sections of the mold one from another.

9. In a casting-machine, the combination with means for subjecting a mass of molten metal to a pressure greater than atmospheric, of an outlet-nozzle through which molten metal is discharged; a shiftable mold embodying an end section and a pair of side sections movable in different directions; a vacuum-chamber in which the mold is located; means for advancing the mold to a position, when a casting is to be made, in which it contacts with the discharge-nozzle, and for withdrawing it therefrom; a valve independent of the mold for controlling the entrance of molten metal thereto; means for exhausting said vacuum-chamber, and thereby exhausting the space extending to the bottom of the mold-space; a power-driven device in the machine, and mechanism operatively connected with such device for actuating the means for advancing the mold, thereby causing the same to assume a casting position; then actuating the valve to admit molten metal under pressure to the exhausted mold, and subsequently shut off all communication of the metal therewith; then actuating the means for withdrawing the mold, thereby withdrawing the mold from its casting position, and for finally separating the side and the end sections of the mold one from another.

10. In a casting-machine, the combination with means for subjecting a mass of molten metal to a pressure greater than atmospheric, of an outlet-nozzle through which molten metal is discharged; a shiftable mold embodying a main casting-forming section and a pair of sprue-forming sections movable relatively to said main section; a vacuum-chamber in which the mold is located; means for advancing the mold to a position, when a casting is to be made, in which in contacts with the nozzle, and for withdrawing it therefrom; a valve independent of the mold for controlling the entrance of molten metal thereto; means for exhausting said vacuum-chamber and thereby exhausting the space extending to the bottom of the mold-space; a power-driven device in the machine, and mechanism operatively connected with such device for actuating the means for advancing the mold, thereby causing the same to assume a casting position; then actuating the valve to admit molten metal under pressure to the casting-mold, and subsequently shut off all communication of the metal therewith; then actuating the means for withdrawing the mold, thereby withdrawing the mold from its casting position, and for finally separating the casting-forming and sprue-forming sections of the mold one from the other.

11. In a casting-machine, the combination with a mold embodying a shiftable main mold-section; a pair of side sections movable in different directions transversely to the line of the shifting movement of the main mold-section, and an auxiliary mold-section movable relatively to and in the line of movement of the main mold-section, of mold-filling means comprising an outlet-nozzle for supplying molten metal to the mold; and means for shifting the side sections and the auxiliary sections relatively to the main mold-section.

12. In a casting-machine, the combination with a mold embodying a shiftable main mold-section, a pair of side sections movable in different directions transversely to the line of shifting movement of the main mold-section, and an auxiliary mold-section movable relatively to and in the line of movement of the main mold-section, of mold-filling means comprising an outlet-nozzle for supplying molten metal to the mold; and means for reciprocating said side section in opposite directions, and said main and auxiliary mold-sections different distances in the same direction at predetermined times.

13. In a casting-machine, the combination with a mold embodying a pair of relatively movable main mold-sections, a pair of side sections movable in different directions transversely to the line of relative movement of the main mold-sections, and an auxiliary mold-section movable relatively to and in the line of relative movement of the main mold-sections, of mold-filling means, comprising an outlet-nozzle for supplying molten metal to the mold; and means for moving the side sections and the auxiliary section relatively to the main mold-sections.

14. In a casting-machine, the combination with a mold embodying a main mold-section comprising a pair of sections; a pair of side sections movable relatively to the main section and an auxiliary section, of a pair of mold-carriers upon which said side sections are respectively mounted; a second pair of mold-carriers, one supported on the other, and upon which the sections constituting the main mold-section are mounted; a carrier for the auxiliary mold-section; and mechanism for shifting all of said carriers relatively to one another.

15. In a casting-machine, the combination, with a separable mold embodying a pair of oppositely-reciprocatory side sections and a pair of end sections, of the following instrumentalities successively effective in the order named—viz., mold-filling means, and mold-separating mechanism for reciprocating said side sections in opposite directions and the end sections different distances in the same direction.

16. In a casting-machine, the combination with a discharge-nozzle and a mold embodying a pair of oppositely-movable sprue-forming mold-sections and a main mold-section transversely to which the sprue-forming sections are movable, of mold-filling means; means for withdrawing the mold from contact with the discharge-nozzle; means for separating the sprue-forming mold-sections; a sprue-separating device movable between the separated sprue-forming sections for parting the sprue from the casting in the main mold-section; a power-driven device in the machine; and mechanism operable therefrom and operatively connected with the sprue-separating device for actuating the sprue-separating device independently of the movement of the mold.

17. In a casting-machine, the combination with a discharge-nozzle, and a mold embodying a pair of oppositely-movable sprue-forming mold-sections and a main mold-section transversely to which the sprue-forming sections are movable, of mold-filling means; means for withdrawing the mold from contact with the discharge-nozzle; means for separating the sprue-forming mold-sections; a sprue-separating device movable between the separated sprue-forming sections for parting the sprue from the casting in the main mold-section; means for separating the casting from the main mold-section; a power-driven device in the machine; and mechanism operable therefrom and operatively connected with the sprue-separating device, and the means for separating the casting from the main mold-section for actuating the same independently of the movement of the mold.

18. In a casting-machine, the combination with a discharge-nozzle and a mold embodying a pair of sprue-forming mold-sections and a pair of main mold-sections for forming the body of the casting and transversely to which main sections said sprue-forming sections are movable, of mold-filling means; means for withdrawing the mold from contact with the discharge-nozzle; means for separating the sprue-forming mold-sections; a sprue-separating device for parting the sprue from the casting; means for separating the casting from the main mold-sections; a power-driven device in the machine; and mechanism operable therefrom and operatively connected with the sprue-separating device and the means for separating the casting from the main mold-section for actuating the same independently of the movement of the mold.

19. In a casting-machine, the combination, with a separable mold embodying a pair of sprue-forming mold-sections, a main section, and a core, of the following instrumentalities successively effective in the order named—viz., mold-filling means; mold-separating means for separating the sprue-forming mold-sections; a sprue-separating device for parting the sprue and the casting; and means for separating the core and the main section of the mold.

20. In a casting-machine, the combination, with a separable mold embodying a pair of sprue-forming mold-sections, a main section, and a core, of the following instrumentalities successively effective in the order named—viz., mold-filling means; mold-separating means for separating the sprue-forming mold-sections; a sprue-separating device for parting the sprue and the casting; and means for shifting the core relatively to the main section of the mold.

21. In a casting-machine, the combination, with a separable mold embodying a pair of sprue-forming mold-sections, a pair of main sections, and a core, of the following instrumentalities successively effective in the order named; viz., mold-filling means; mold-separating means for separating the sprue-forming mold-sections; a sprue-separating device for parting the sprue and the casting; means for separating the main sections of the mold; and means for shifting the core relatively to one of said main sections.

22. In a casting-machine, the combination, with a separable mold embodying a pair of sprue-forming mold-sections, a pair of main sections, and a core, of the following instrumentalities successively effective in the order named—viz., mold-filling means; mold-separating means for separating the sprue-forming mold-sections; a sprue-separating device for parting the sprue and the casting; means for shifting the core and one of the main sections of the mold in unison relatively to the other main section of the mold; and means for shifting the core relatively to said shifted main section of the mold.

23. In a casting-machine, the combination with a mold embodying a pair of sprue-forming mold-sections and a pair of main mold-sections for forming the body of the casting, and transversely to which main sections said sprue-forming sections are movable, of a discharge-nozzle; mold-filling means; means for withdrawing the mold from contact with the discharge-nozzle; means for separating the sprue-forming mold-sections; a sprue-separating device for parting the sprue from the casting and which is movable across the space between the separated sprue-forming sections; means for separating the main sections of the mold; a casting-stripper; a power-driven device in the machine; and mechanism operable therefrom and operatively connected with the casting-stripper and the sprue-separating device for actuating the same independently of the movement of the mold.

24. In a casting-machine, the combination, with a separable mold embodying a pair of sprue-forming mold-sections and a pair of main sections for forming the body of the casting, of the following instrumentalities successively effective in the order named—viz., mold-filling means; mold-separating means for separating the sprue-forming mold-sections; a sprue-separating device movable between the opened sprue-forming mold-sections for parting the sprue and the casting; means for separating the main sections of the mold; and a casting-stripper movable between the opened main sections of the mold.

25. In a casting-machine, the combination with a mold embodying a main mold-section and a pair of sprue-forming mold-sections movable relatively to the main section, of mold-filling means; means for separating the mold-sections; and mold-cleaning means movable across the space between the separated sprue-forming mold-sections.

26. In a casting-machine, the combination with a mold embodying a main mold-section and a pair of sprue-forming mold-sections movable relatively to the main section, of mold-filling means; means for separating the mold-sections; and a mold-cleaning brush movable across the space between the separated sprue-forming mold-sections.

27. In a casting-machine, the combination, with a separable mold embodying a sprue-forming mold-section and also embodying a main section for forming the body of the casting, of mold-filling means; mold-separating means for separating the sprue and the sprue-forming mold-section; a combined brush and sprue separating device for cleaning a mold-section and parting the sprue and the casting; and means for separating the main section of the mold and the body of the casting.

28. In a casting-machine, the combination with a sectional mold embodying a pair of oppositely-movable mold-sections and with mold-filling means, of a shiftable carriage upon which the mold is mounted; means for separating the sections of the mold; and scrapers for scraping the cheeks of said sections, said scrapers being movable with the carriage and moving across the cheeks of the mold-sections during their separating movement.

29. In a casting-machine, the combination with a sectional mold embodying a pair of oppositely-movable mold-sections and with mold-filling means, of a carriage upon which the mold is mounted; means for separating the sections of the mold; and scrapers fixed relatively to said carriage for scraping the cheeks of said sections during their separating movement.

30. In a casting-machine, the combination, with a mold embodying a pair of oppositely-disposed mold-sections, of mold-filling means; mold-separating means for shifting said mold-sections in opposite directions; and a pair of oppositely-disposed mold-scrapers for scraping the cheeks of said mold-sections.

31. In a casting-machine, the combination, with mold-filling means having a discharge-nozzle for supplying molten metal to the mold, of a separable mold embodying a pair of complementary sprue-forming mold-sections movable toward and from each other and also movable toward and from said nozzle to bring the cheeks of said mold-sections into engagement with, and carry them away from, the face of said nozzle, and means for scraping said cheeks of the mold-sections.

32. In a casting-machine, the combination, with mold-filling means having a discharge-nozzle for supplying molten metal to the mold, of a separable mold embodying a pair of complementary sprue-forming mold-sections movable toward and from each other and also movable toward and from said nozzle to bring the cheeks of said mold-sections into engagement with, and carry them away from, the face of said nozzle, and a pair of mold-scrapers effective respectively for scraping said cheeks of the mold-sections.

33. In a casting-machine, the combination, with a vacuum-chamber having a plurality of openings therein, of a separable mold located within said chamber and embodying a plurality of mold-sections; means for filling said mold with molten metal and exerting a high pressure upon the latter and every point in the walls of the mold-space at the moment of complete filling of the mold; a plurality of operating members working respectively in said openings; air-tight packings between the operating members and the walls of said openings; a main mold-carrier for one of said mold-sections; a plurality of auxiliary mold-carriers supported on the main mold-carrier and each supporting a different mold-section; and connecting means between the respective operating members and the several mold-carriers.

34. In a casting-machine, the combination, with a vacuum-chamber having a plurality of openings therein, of a separable mold located within said chamber and embodying a plurality of mold-sections; means for filling said mold with molten metal and exerting a high pressure upon the latter and every point in the walls of the mold-space at the moment of complete filling of the mold; a plurality of operating members working respectively in said openings; air-tight packings between the operating members and the walls of said openings; a main mold-carrier for one of said mold-sections; an auxiliary mold-carrier supported on the main mold-carrier and carrying a mold-section; a core-carrier also supported on the main mold-carrier and carrying a core-section; and connections from the respective operating members to the mold-carriers and the core-carrier.

35. In a casting-machine, the combination, with a vacuum-chamber having a plurality of openings therein, of a separable mold located within said chamber and embodying a plurality of mold-sections; mold-filling means; a casting-stripper also located within said chamber; a plurality of operating members working respectively in said openings; airtight packings between the operating members and the walls of the openings; and connections from the respective operating members to the mold-sections and the casting-stripper.

36. In a casting-machine, the combination, with a vacuum-chamber having a plurality of openings therein, of a separable mold located within said chamber and embodying a plurality of mold-sections; mold-filling means; mold-cleaning means and a casting-stripper also located within said chamber; a plurality of operating members working respectively in said openings; air-tight packings between the operating members and the walls of the openings; and connections from the respective operating members to the mold-sections, the mold-cleaning means, and the casting-stripper.

37. In a casting-machine, the combination, with a vacuum-chamber having a plurality of openings therein, of a separable mold located within said chamber and embodying a plurality of mold-sections; mold-filling means; a sprue-separating device and a casting-stripper also located within said chamber; a plurality of operating members working respectively in said openings; air-tight packings between the operating members and the walls of the openings; and connections from the respective operating members to the mold-sections, the sprue-separating device, and the casting-stripper.

38. In a casting-machine, the combination, with a vacuum-chamber having a plurality of openings therein, of a separable mold located within said chamber and embodying a plurality of mold-sections; mold-filling means; a plurality of differentially-effective spring-pressed operating members working in said openings and controlling respectively said mold-sections; and air-tight packings between said operating members and the walls of said openings.

39. In a casting-machine, the combination, with a vacuum-chamber having an opening therein, of a separable mold located within said chamber and embodying a plurality of mold-sections; mold-filling means; means for separating the mold-sections; a stripper-operating shaft working in said opening in the chamber; an air-tight packing between said shaft and the walls of said opening; and a casting-stripper located within said chamber and effective on the separation of said mold-sections.

40. In a casting-machine, the combination with an outlet-nozzle, of a mold embodying side sections movable in opposite directions and a main section movable transversely to the direction of movement of the side sections; yielding means for exerting pressure upon the mold and the mold-sections during the filling of the mold; a power-driven device in the machine; cam-face actuators operatively connected with such device for withdrawing the mold from the outlet-nozzle; and other cam-face actuators for separating the sections of the mold one from the other independently of the backward movement of the mold from the outlet-nozzle.

41. In a casting-machine, the combination with an outlet-nozzle and a mold embodying a pair of side sections and a main section, of springs for pressing the side sections together; means for pressing the mold yieldingly against the nozzle; a power-driven device in the machine; a cam-face actuator operatively connected with such device for withdrawing the same from the outlet nozzle; and other cam-face actuators for separating the sections of the mold one from the other independently of the backward movement of the mold from the outlet-nozzle.

42. In a casting-machine, the combination, with mold-filling means, of a separable mold embodying a pair of spring-pressed side sections, a pair of spring-pressed end sections movable transversely to the side sections, and a spring-pressed core also movable transversely to the side sections.

43. In a casting-machine, the combination, with a mold and with mold-filling means, of mechanism for positioning one of said elements relatively to the other, and an electromagnetic safety device effective reciprocally with said positioning mechanism and governed by the position of said elements and operative for preventing filling of the mold when said element is improperly positioned.

44. In a casting-machine, the combination, with an electric circuit having a normally open break, of a separable mold embodying a pair of mold-sections adapted when closed to close said break in the circuit; mold-filling means; mold-closing means; and an electromagnetic safety device controlled by said circuit and normally operative for blocking the operation of the mold-filling means.

45. In a casting-machine, the combination, with an electric circuit having two normally open breaks therein, of a separable mold embodying a plurality of mold-sections adapted when closed to close said breaks in the circuit; mold-filling means; mold-closing means; and an electromagnetic safety device controlled by said circuit and normally operative for blocking the operation of the mold-filling means.

46. The combination, with a vacuum-chamber having an opening, of a mold located within said chamber; mold-filling means; and vacuum-maintaining, casting receiving and discharging means sealing said opening and operative alternately for receiving and discharging castings.

47. The combination, with a vacuum-chamber having an opening, of a mold located within said chamber; mold-filling means; and liquid-containing, vacuum-maintaining, casting receiving and discharging means forming a liquid seal for said opening and operative alternately for receiving and discharging castings.

48. The combination, with a receptacle and with a vacuum-chamber adapted to communicate therewith, of a mold located within said vacuum-chamber; mold-filling means; and a valve controlling communication between said receptacle and the vacuum-chamber and having a casting-receiving chamber.

49. The combination, with a vacuum-chamber open at its lower end, of a mold located within said chamber; mold-filling means; a receptacle at the open end of said chamber; and a valve controlling communication between said receptacle and the vacuum-chamber and having a casting-receiving chamber normally located under the mold.

50. The combination, with a vacuum-chamber and with an open liquid-containing receptacle communicating therewith, of a mold located within said chamber; mold-filling means; and a valve controlling communication between said receptacle and the vacuum-chamber and having a liquid-containing, casting-receiving chamber.

51. The combination, with a vacuum-chamber having an opening, of a separable mold located within said chamber; mold-filling means; mechanism for opening and closing the mold; and vacuum-maintaining, casting receiving and discharging means sealing said opening and operative alternately for receiving and discharging castings.

52. The combination, with a vacuum-chamber having a discharge-opening, of a mold located within said chamber; mold-filling means; and a casting-receiving valve controlling communication between said discharge-opening and the outside atmosphere.

53. The combination, with a vacuum-chamber having a discharge-opening, of a mold located within said chamber; mold-filling means; and a casting-receiving valve open at one side only and controlling communication between said discharge-opening and the outside atmosphere.

54. The combination, with a vacuum-chamber open at its lower end, of a mold located within said chamber; mold-filling means; and a casting-receiving valve adapted to seal the open end of said chamber and controlling communication therewith.

55. The combination, with a vacuum-chamber having a discharge-opening, of a mold located within said chamber; mold-filling means; and an oscillatory casting-receiving valve controlling communication between said discharge-opening and the outside atmosphere.

56. The combination, with a vacuum-chamber having a discharge-opening, of a mold located within said chamber; mold-filling means; and an oscillatory casting-receiving plug-valve controlling communication between said discharge-opening and the outside atmosphere.

57. The combination, with a vacuum-chamber having a discharge-opening, of a mold located within said chamber; mold-filling means; an oscillatory casting-receiving valve controlling communication between said discharge-opening and the outside atmosphere and having a projecting stem; and an air-tight packing surrounding said stem.

58. The combination, with a vacuum-chamber having a discharge-opening, of a mold located within said chamber; mold-filling means; and an oscillatory casting-receiving valve controlling communication between said discharge-opening and the outside atmosphere; and means for limiting the movements of said valve.

59. In a casting-machine, the combination with a vacuum-chamber having an opening in one of its walls, of a mold located in the vacuum-chamber; mold-filling means embodying a removable discharge-nozzle projecting into said opening in the vacuum-chamber; an annular member secured to the vacuum-chamber over said opening in the wall of the chamber and provided with a retaining-channel adjacent to the edge of the opening; a clamping-ring engaging with the removable nozzle and positively securing the same to the mold-filling means; means for securing said clamping-ring to said annular member; and a heat-insulating packing located in said retaining-channel in the annular member and in contact with the edge of the opening in the wall of the vacuum-chamber to thereby maintain an air-tight joint between the wall of the vacuum-chamber and the said annular member during the expansion and contraction of the parts.

CURTIS H. VEEDER.

Witnesses:
E. BARRIE SMITH,
HENRY BISSELL.